No. 730,860. PATENTED JUNE 16, 1903.
G. O. BAKER.
ELECTRIC MOTOR SYSTEM.
APPLICATION FILED MAY 10, 1901.
NO MODEL. 2 SHEETS—SHEET 1.

Witnesses.
Marcus L. Byng.
Benjamin B. Hull.

Inventor.
George O. Baker,
by Albert G. Davis Atty.

No. 730,860. PATENTED JUNE 16, 1903.
G. O. BAKER.
ELECTRIC MOTOR SYSTEM.
APPLICATION FILED MAY 10, 1901.
NO MODEL. 2 SHEETS—SHEET 2.

Witnesses.
Marcus L. Byng.
Benjamin B. Hull.

Inventor.
George O. Baker,
by Allen G. Davis
Att'y.

No. 730,860. Patented June 16, 1903.

UNITED STATES PATENT OFFICE.

GEORGE O. BAKER, OF NEW YORK, N. Y., ASSIGNOR TO GENERAL ELECTRIC COMPANY, A CORPORATION OF NEW YORK.

ELECTRIC-MOTOR SYSTEM.

SPECIFICATION forming part of Letters Patent No. 730,860, dated June 16, 1903.

Application filed May 10, 1901. Serial No. 59,601. (No model.)

*To all whom it may concern:*

Be it known that I, GEORGE O. BAKER, a citizen of the United States, residing in the city, county, and State of New York, have invented certain new and useful Improvements in Electric-Motor Systems, of which the following is a specification.

This invention relates to electric-motor systems, and has for its object the provision of means whereby an electric motor used for driving machinery may be converted immediately into a braking-generator by the operation of a circuit-breaking device controlling the power-circuit.

In many classes of machines—such, for instance, as printing-presses—it is desirable to be able to stop the machine very quickly to prevent injury to the mechanism or the work. When the machine is driven by an electric motor, it is well known that the supply of current to the motor may be quickly cut off by including an electromagnetic circuit-breaker in series with the motor and providing a control-circuit, with push-buttons located at convenient points, so that an attendant by pressing one of said buttons can cause the circuit-breaker to operate. It has also been proposed to so construct a motor-controller that when necessary it will automatically shut off the power by coming to "off" position and will then short-circuit the motor through a resistance, so that the motor will act as a generator, driven by its own momentum and that of the machine to which it is connected, and thus serve as a brake to stop the machine. My invention aims to combine both these ideas by so constructing the circuit-breaker that when it operates it will automatically close the circuit of the motor through a local circuit, thereby causing the motor to act as a braking-generator immediately without waiting for the controller to be returned to its off position or for the operation of any intermediate mechanism.

Figure 1:
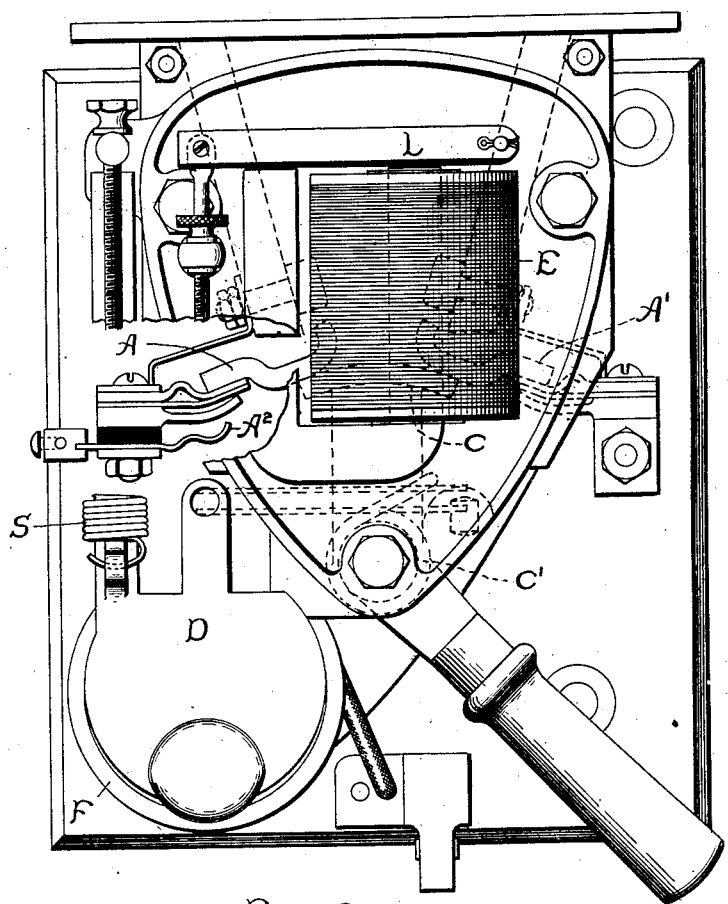
Figure 2:
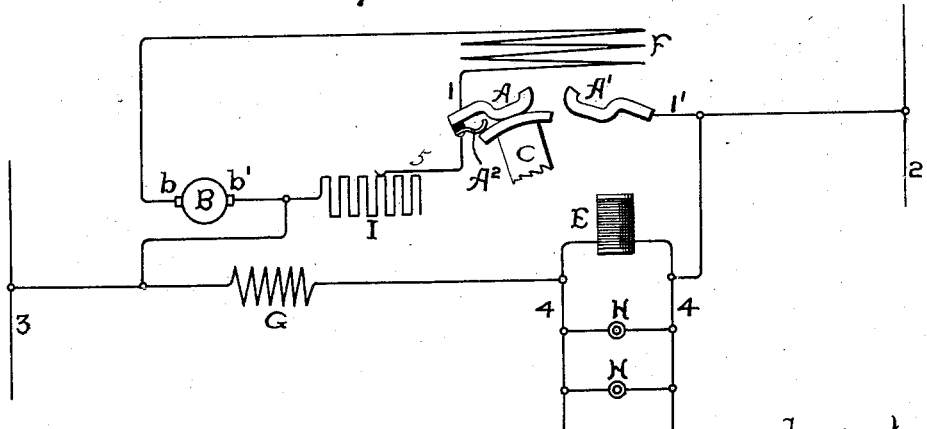
Figure 4:
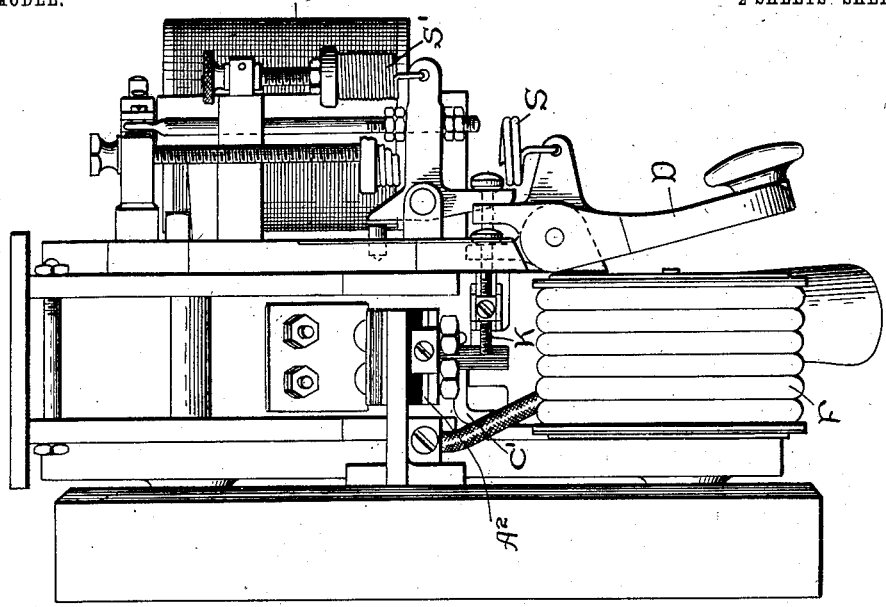
Figure 3:
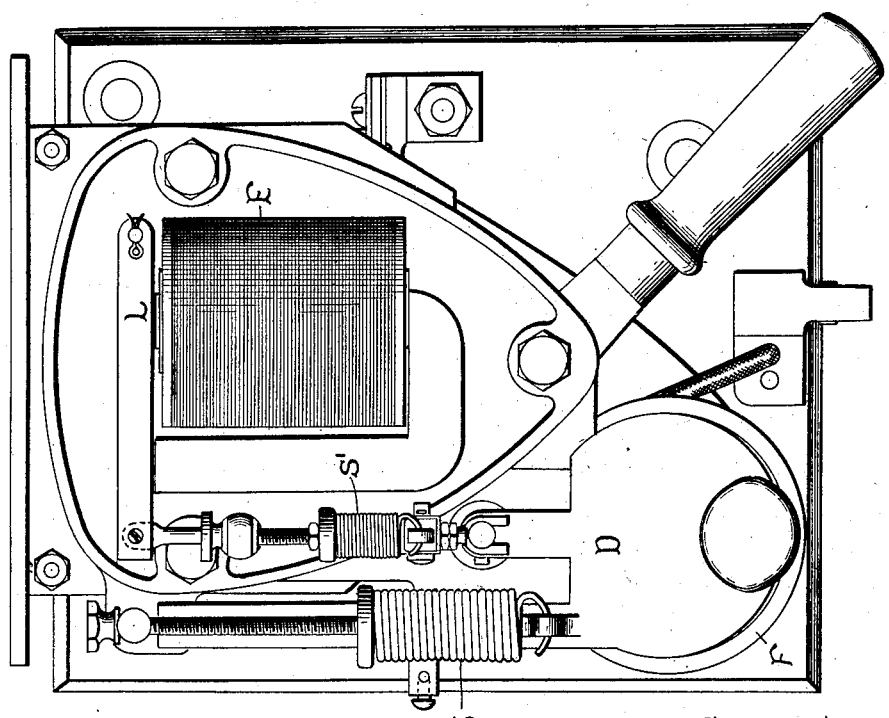

In the accompanying drawings, Figure 1 is a front elevation of an automatic circuit-breaker, partly broken away to show my improvements. Fig. 2 is a diagram of the circuits. Fig. 3 is a front elevation, and Fig. 4 is a side elevation, of the complete circuit-breaker.

The circuit-breaker may be of a well-known commercial type. The particular type shown in the drawings is the standard General Electric MQ circuit-breaker, which is well-known in the market. In this type there are two stationary but spring-mounted contact-plates A A', with which are connected the branch conductors 1 1', carrying current from the main lead 2 to one brush $b$ of the armature B of a shunt-motor. The movable contact C of the circuit-breaker is held locked in a position to bridge the plates A A' by a catch K, which is controlled by the overload electromagnet-coil F, whose armature is shown at D, and an underload or no-voltage coil E, with armature L, added to the standard commercial circuit-breaker. A coiled spring $c'$ throws the movable contact C away from the plate A', and thus breaks the motor-supply circuit instantaneously whenever the catch K is tripped. This may be caused by the attraction of armature D to coil F against spring S when excess of current in coil F unduly energizes it or the throwing away of armature L from coil E by spring S' when coil E is deënergized. Coil E may be deënergized by failure of current from source of supply or by pressing a push-button H, and thus closing a shunt around it. The overload-coil F is arranged near the plates A A' in series with the plate A and the armature B and serves also as a blow-out coil to extinguish the arc when the contact C separates from the plate A'. The shunt-wound field-coil G of the motor is permanently connected across the main leads 2 3 in series with the underload-coil E. In shunt around the coil E is a circuit 4, containing one or more normally open push-buttons H, connected in multiple. It is evident that the pushing of one of these buttons will cause the circuit-breaker to operate.

In order to convert the motor into a braking-generator when the circuit-breaker operates, an auxiliary contact-plate $A^2$ is arranged adjacent to but insulated from the plate A. A conductor 5 connects the plate $A^2$ with the brush $b'$ of the motor-armature through a resistance I, which may be adjustable, as shown. The plate $A^2$ is so located that when the contact C moves off the plate A' it will engage with the plate $A^2$ while still in contact with the plate A, thus closing a local circuit through the blow-out coil F, armature B, and resistance I.

Line-current having been cut off and the local circuit closed in the manner described, the motor, if it continues to rotate from its own momentum and that of the machine to which it is connected, will operate as a generator, sending a current through the resistance I, and offering such a load in opposition to the momentum of the machine as to stop it very quickly. In practice a large printing-press can be brought from full speed to a dead stop while its bed is moving six inches.

Though I prefer to employ an automatic circuit-breaker of the type described, it is not absolutely essential, as other devices of this character provided with arc-extinguishing devices to safely interrupt the current and adapted to be tripped in a manner substantially similar to that described may be employed.

What I claim as new, and desire to secure by Letters Patent of the United States, is—

1. In an electric-motor circuit, a circuit-breaking device having two stationary contacts, a movable contact which completes the supply-circuit through the two stationary contacts, and an auxiliary contact which becomes electrically connected to one of the stationary contacts by the movable contact whenever said movable contact is actuated to open the supply-circuit, thereby closing a local circuit through the motor.

2. In an electric-motor circuit, an automatic circuit-breaker having two stationary contacts, a movable contact which completes the supply-circuit through the two stationary contacts, and an auxiliary contact which becomes electrically connected to one of the stationary contacts by the movable contact whenever the movable contact is actuated to open the supply-circuit, thereby closing a local circuit through the motor.

3. The combination with an electric motor, of a circuit-breaker for instantaneously opening the supply-circuit of said motor, means for automatically short-circuiting the motor-armature upon itself upon operation of the circuit-breaker, a tripping device for said breaker having its coil in series with the motor-field, and means for operating said tripping device from a distance.

4. The combination with an electric motor, of an automatic circuit-breaker provided with contacts arranged to close a local circuit through the motor so as to convert it into a braking-generator immediately upon operation of the circuit-breaker, a tripping-coil in series with the motor-field, means operated thereby for opening the circuit-breaker, and means for short-circuiting said coil from a distance.

In witness whereof I have hereunto set my hand this 7th day of May, 1901.

GEORGE O. BAKER.

Witnesses:
CHAS. T. HUGHES,
HAYGORTH LEONARD.